E. MARTIN.
LUBRICATING DEVICE FOR PLUG COCKS.
APPLICATION FILED APR. 16, 1913.
1,069,156.
Patented Aug. 5, 1913.
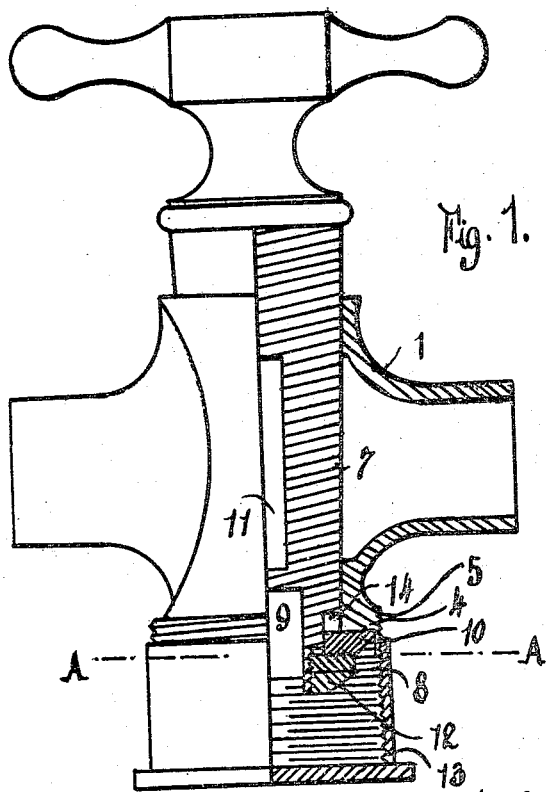
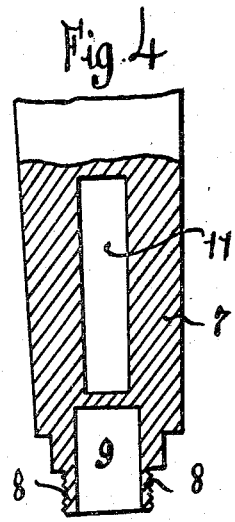
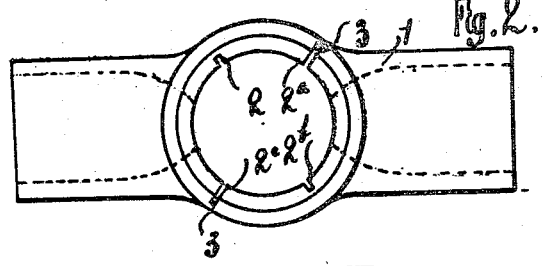
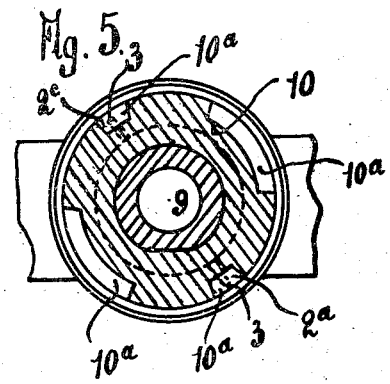
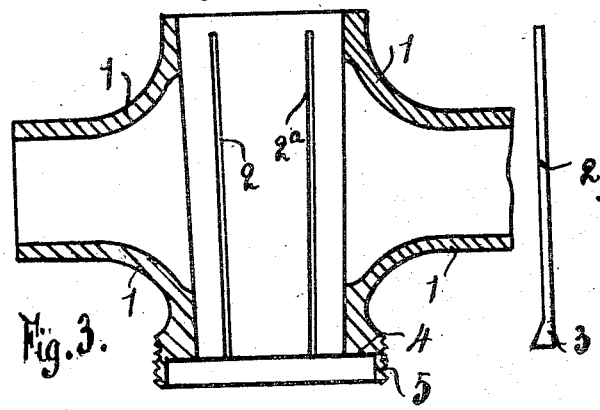
INVENTOR:
Emile Martin

UNITED STATES PATENT OFFICE.

EMILE MARTIN, OF GRENOBLE, FRANCE.

LUBRICATING DEVICE FOR PLUG-COCKS.

1,069,156.

Specification of Letters Patent.  Patented Aug. 5, 1913.

Application filed April 16, 1913.  Serial No. 761,408.

*To all whom it may concern:*

Be it known that I, EMILE MARTIN, a citizen of the French Republic, residing at Grenoble, in the Republic of France, have invented certain new and useful Improvements in Lubricating Devices for Plug-Cocks, of which the following is a specification.

A lubricating device for the permanent and automatic lubrification of the parts of plug cocks which are in contact, the lubrification being effected without dismounting the cock.

The invention consists in such peculiar features of construction and combination of parts as shall hereinafter be more clearly described and pointed out in the claim.

Figure 1 represents an elevation of a cock, partly in section. Fig. 2 represents a plan view of the casing. Fig. 3 represents a longitudinal section of Fig. 2. Fig. 4 represents a section of the lower part of the plug. Fig. 5 is a section on line A—A of Fig. 1. Fig. 6 represents a groove.

The casing 1 of the cock has four grooves 2, $2^a$, $2^b$, $2^c$ which are parallel with the generating line of the plug. The two grooves $2^a$, $2^c$ have an extension 3 at the lower end as shown in Figs. 2 and 6, said extensions serving as inlets for the lubricant which comes from the reservoir 13 and flows into the annular space 14 and from there into the four grooves. The ends of the grooves 2, $2^a$ are however covered by the washer 10. The grooves 2, $2^a$, $2^b$, $2^c$ terminate in the annular groove 4 which is perfectly plane and stands perpendicular to the axis of the plug. The casing has at its lower end a threaded part 5 upon which the reservoir 13 for the lubricant is screwed.

The plug 7 has a threaded extension 8 at its lower end which contains a cavity 9 designed to form an air chamber for the air under pressure which is necessary for effecting the automatic lubrification. This extension 8 is surrounded by a washer 10 with indentations $10^a$ arranged in such a manner that the extensions 3 of the grooves $2^a$, $2^c$ are covered when the port 11 of the plug moves before said grooves whereby the inflow of lubricant into the port is prevented. The washer 10 is fixed by means of a conical nut 12.

The operation of this cock is as follows:—
When the plug 7 has been inserted in the cavity of the cock the washer 10 is put in place and fixed by the conical nut 12 which is moderately tightened whereupon the reservoir 13 which has been filled with the lubricant is screwed upon the threaded extension 5 of the casing. The lubricant which almost completely fills the reservoir 13 is in contact with the lower end of the plug uncovered by the indentations $10^a$ of the washer and further with said washer and its nut. The lubricant cannot escape through the threaded part 5 and as too large a quantity of lubricant is forced out of the reservoir it collects in the chamber 9 compressing the air contained in said chamber. The air under pressure supplies the power for forcing out the lubricant into the grooves $2^a$, $2^c$ according to the consumption. As only very little lubricant is required for the cock a continuous and automatic lubrification is insured.

It is advisable to occasionally screw up the reservoir 13. In order to compensate for the wear of the plug a washer of the Belleville type can be inserted between the washer 10 and the nut 13. The cock being continuously lubricated will last a very long time without any repairs. It is evident that the shapes and dimensions of the different parts can be modified without departing from the idea of the invention.

I claim:—

In an improved plug cock with permanent and automatic lubrification, in combination, a cock casing having four vertical grooves two of which have an extension at the lower end, said casing having an annular groove at the lower end, a threaded extension at the lower end of said casing, a plug positioned within said casing, a threaded hollow extension at the lower end of said plug, a washer having indentations mounted upon said lower extension of the plug, a conical nut screwed upon said lower extension and pressing the washer against the bottom of said annular groove of the casing, and a reservoir for lubricant screwed upon said threaded extension of the casing so that the lubricant will enter the hollow portion of said extension of the plug and compress the air contained in said hollow which in its turn forces the lubricant through the indentations in said washer and into said vertical grooves, substantially as described and shown and for the purpose set forth.

In witness whereof I have hereunto set my hand in the presence of two witnesses.

EMILE MARTIN.

Witnesses:
 A. GUERREL,
 E. MARTIN.